(12) United States Patent
Rozendaal et al.

(10) Patent No.: US 8,196,672 B2
(45) Date of Patent: *Jun. 12, 2012

(54) CONSERVATION TILLAGE IMPLEMENT, SYSTEM AND METHOD

(75) Inventors: Jacobus A. Rozendaal, Salford (CA); Philip M. O'Grady, Castleton (CA); James F. Boak, Leamington (CA); John M. Averink, Norwich (CA); Geof J. Gray, Woodstock (CA)

(73) Assignee: Salford Farm Machinery Ltd. (CA)

( * ) Notice: Subject to any disclaimer, the term of this patent is extended or adjusted under 35 U.S.C. 154(b) by 0 days.

This patent is subject to a terminal disclaimer.

(21) Appl. No.: 12/959,844

(22) Filed: Dec. 3, 2010

(65) Prior Publication Data

US 2011/0073333 A1 Mar. 31, 2011

Related U.S. Application Data

(62) Division of application No. 12/829,210, filed on Jul. 1, 2010, which is a division of application No. 10/521,804, filed as application No. PCT/CA2004/000339 on Mar. 5, 2004, now Pat. No. 7,762,345.

(60) Provisional application No. 60/451,666, filed on Mar. 5, 2003.

(51) Int. Cl.
*A01B 7/00* (2006.01)

(52) U.S. Cl. ............... 172/573; 172/142; 172/146

(58) Field of Classification Search ............ 172/138, 172/139, 140, 145, 165, 572, 573, 1, 142, 172/146; 111/140, 190, 191, 192, 193, 194, 111/195

See application file for complete search history.

(56) References Cited

U.S. PATENT DOCUMENTS

| | | | | |
|---|---|---|---|---|
| 3,502,154 A * | 3/1970 | Rogers | | 172/311 |
| 4,350,211 A * | 9/1982 | Coufal | | 172/311 |
| 4,535,849 A * | 8/1985 | Dietrich, Sr. | | 172/468 |
| 4,759,411 A * | 7/1988 | Williamson | | 172/572 |
| 5,462,124 A * | 10/1995 | Rawson | | 172/569 |
| 5,881,820 A * | 3/1999 | Baker | | 172/455 |
| 5,956,934 A * | 9/1999 | Wright et al. | | 56/377 |
| 5,957,217 A * | 9/1999 | Gunnink | | 172/166 |
| 6,216,616 B1 * | 4/2001 | Bourgault | | 111/186 |
| 6,412,571 B1 * | 7/2002 | McIlhargey | | 172/572 |
| 6,557,646 B1 * | 5/2003 | Hurtis et al. | | 172/156 |
| 6,612,381 B2 * | 9/2003 | Powell et al. | | 172/586 |
| 6,896,068 B2 * | 5/2005 | Dietrich et al. | | 172/145 |
| 7,762,345 B2 * | 7/2010 | Rozendaal et al. | | 172/573 |
| 2003/0085044 A1 * | 5/2003 | McFarlane | | 172/146 |
| 2003/0141088 A1 * | 7/2003 | Kovach et al. | | 172/799.5 |

* cited by examiner

*Primary Examiner* — Robert Pezzuto
*Assistant Examiner* — Jamie L McGowan
(74) *Attorney, Agent, or Firm* — Katten Muchin Rosenman LLP

(57) ABSTRACT

A conservation tillage implement having three or more rows of individual coulter wheel assemblies laterally spaced apart and removably mounted on a cultivator frame, a coulter wheel assembly in a given row being staggered with respect to the coulter wheel assemblies in a longitudinally adjacent row. The coulter wheel assemblies may be laterally adjustable and may be mounted to the cultivator frame using a mounting means that permits rotation about a vertical axis. The coulter wheel assemblies may have a coil spring with a horizontal spring axis to permit upward deflection in response to impact with an obstacle. Leveling attachments may optionally be mounted to the cultivator frame, along with additional field working tools. The implement is used in the management of crop residue as part of a minimum tillage strategy. The implement is particularly resistant to plugging and can be operated at high speeds without undue damage upon impact with obstacles. Advantageously, the implement can be operated in standing water, as found in the growing of rice.

20 Claims, 13 Drawing Sheets

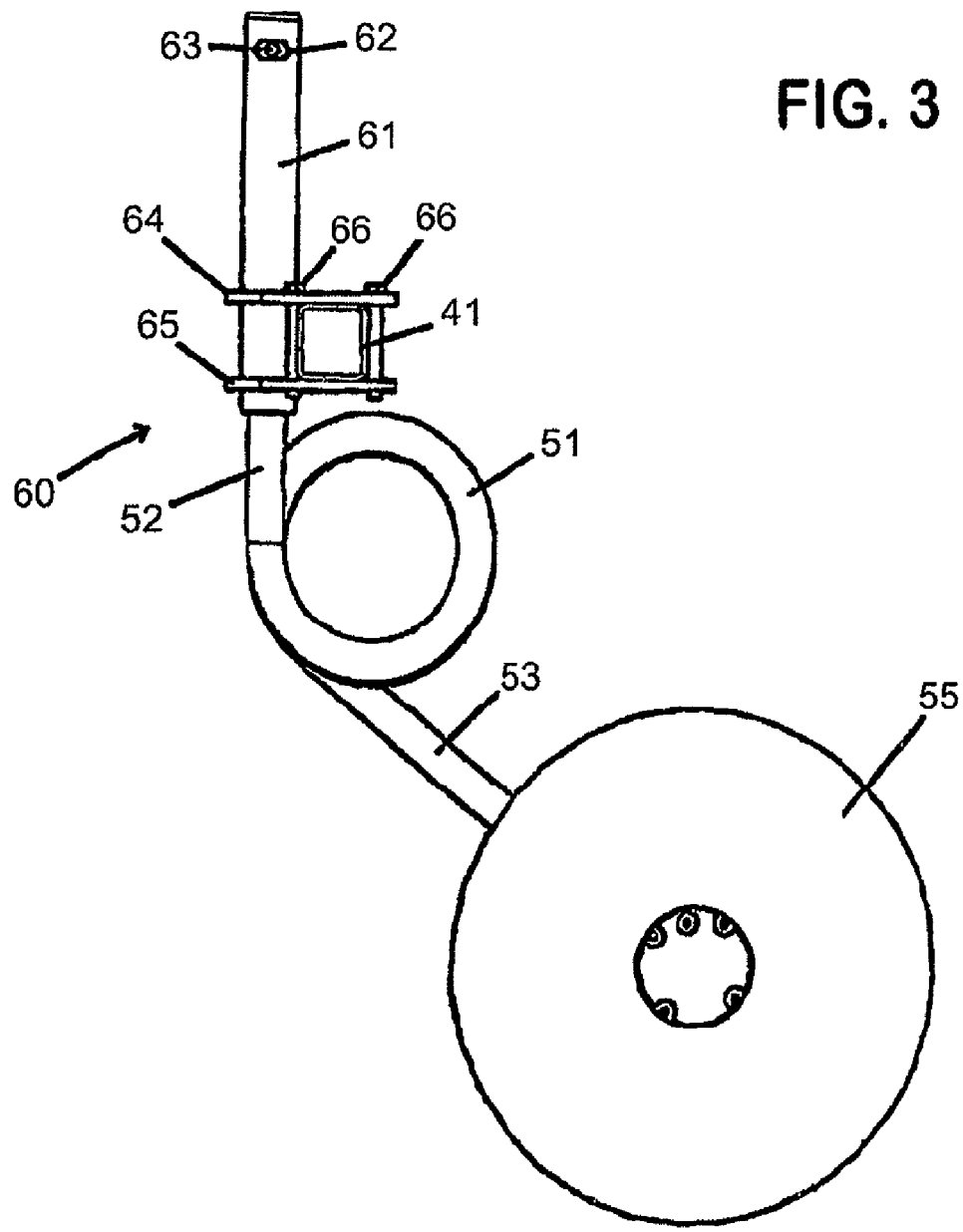

CONSERVATION TILLAGE IMPLEMENT, SYSTEM AND METHOD

This application is a divisional of U.S. patent application Ser. No. 12/829,210, filed Jul. 1, 2010, which is a divisional of U.S. patent application Ser. No. 10/521,804, filed Jan. 21, 2005 (now U.S. Pat. No. 7,762,345, issued Jul. 27, 2010), which is a 371 of International Appln. No. PCT/CA2004/000339, filed Mar. 5, 2004, which claims the benefit of U.S. Provisional Appln. No. 60/451,666, filed Mar. 5, 2003, the contents of all incorporated herein by reference.

FIELD OF THE INVENTION

The present invention relates to an apparatus, system and method for minimally tilling a field as part of a conservation tillage strategy. More particularly, the present invention relates to an apparatus system, and method for crop residue management.

BACKGROUND OF THE INVENTION

Plant residue is plant material that remains in a field following a particular growing season. Plant residue includes roots, stem, leaves and seed bearing or enclosing plant structures (e.g. pods, cobs and husks) originating from plants present in the field during the previous growing season (eg: seeded crops, volunteer species and weeds). In order to plant a new crop in a field, plant residue from the previous crop must first be dealt with.

When following conventional tillage practices, crop residue is typically buried by turning over the soil using, for example, a plow such as a mold board plow or a chisel plow, a disc harrow, a field cultivator, or another suitable field working implement.

Conventional tillage practices have been followed for centuries. However, in recent years, conventional tillage practices have fallen out of favor since the underlying soil exposed during turning is especially prone to erosion. Also, for economic reasons, it is desirable to make a minimal number of trips across a field.

Conservation tillage practices have been used to address the disadvantages of conventional tillage practices. When using conservation tillage practices, crop residue is minimally disturbed prior to planting and is typically left in the field unburied. Often, a crop is planted through the crop residue using no-till planting techniques and a no-till planting implement adapted for that purpose.

One such planting implement comprises a combination of a conventional planter and a coulter wheel assembly. There are several examples in the prior art of coulter wheels and coulter wheel assemblies that are used as part of no-till planting implements. U.S. Pat. No. 5,473,999, issued on Dec. 12, 1995 to Rawson et al., discloses three coulter wheels in a triangular arrangement. U.S. Pat. No. 5,957,217, issued on Sep. 28, 1999 to Gunnink, discloses a strip tillage apparatus comprising a pair of coulter wheels rotatably mounted on a walking beam which in turn is pivotally mounted on a frame for mounting on a tool bar of a draft vehicle. U.S. Pat. No. 5,462,124, issued on Oct. 31, 1995 to Rawson, discloses a dual coulter device having a pair of coulter wheels arranged in a staggered relationship for mounting on a single tool bar. U.S. Pat. No. 6,412,571, issued on Jul. 2, 2002 to Mcilhargey, discloses a coulter wheel assembly comprising a vertical shank having a coiled spring. U.S. Pat. No. 5,649,602, issued on Jul. 22, 1997 to Bruce, discloses a coulter wheel which has wavy acutely angled flutes for greater cutting performance.

However, when using no-till planting techniques, crop residue prevents the soil from drying and warming following, for example, a winter season having cold temperatures and much precipitation. A farmer is prevented from planting a crop until the soil is sufficiently dry and warm. Consequently, the planting of crops is delayed shortening the growing season and having a potentially adverse impact on crop yields.

A new form of conservation tillage has recently emerged wherein the soil is minimally disturbed prior to planting in order to allow air to penetrate the mat of crop residue. This technique is variously known as minimum tillage, residue management, soil aeration or seedbed aeration. A farm implement is used to cut the crop residue and penetrate a short distance into the surface of the soil while lifting the soil vertically to permit access of air to the soil. This farm implement is sometimes known as a vertical tillage implement. Examples of such an implement are the Turbotill™ sold by Great Plains Manufacturing and the Reel Till™ sold by McFarlane Manufacturing Company. These purpose-built minimum tillage implements comprise a frame and one or two rows of coulter wheels connected by a gang shaft that is rotatably mounted to the underside of the implement frame. The implements are designed to cut and size residue in preparation for planting a field, followed by a series of conventional leveling attachments, such as spike harrows (eg: Buster Bars™) and/or rotary harrows.

However, the foregoing purpose-built minimum tillage implements suffer from several disadvantages. Firstly, since the coulter wheels are mounted on a gang shaft, the spacing of the coulter wheels is close together and is not laterally adjustable. When a large amount of crop residue is present, crop residue can collect between adjacent coulter wheels so that they become plugged, impeding rotation of the gang shaft and causing crop residue to be pushed into a mound by the movement of the implement. Secondly, the gangs do not allow for deflection of individual coulter wheels in response to impact with obstacles, for example rocks, potentially resulting in damage to the coulter wheel, the gang shaft, or the implement. Thirdly, the implement is purpose-built and is only usable for residue management; thus, the farmer must bear the expense of an extra piece of equipment which lies idle most of the year.

SUMMARY OF THE INVENTION

According to the present invention, there is provided a conservation tillage implement comprising: a cultivator frame having three or more longitudinally spaced apart transverse cross-members; a plurality of individual coulter wheel assemblies; a mounting means corresponding to each individual coulter wheel assembly; and, three or more longitudinally spaced apart rows of laterally spaced apart individual coulter wheel assemblies, each coulter wheel assembly removably mounted on the frame using the mounting means, a coulter wheel assembly in a given row being staggered with respect to the coulter wheel assemblies in a longitudinally adjacent row.

According to another aspect of the invention, there is provided a kit for making a conservation tillage implement as previously described from an existing cultivator frame comprising: a plurality of coulter wheel assemblies; a plurality of mounting means for mounting the coulter wheel assemblies to the cultivator frame; and, a set of instructions for mounting the coulter wheel assemblies to the cultivator frame using the mounting means.

According to another aspect of the invention, there is provided a method of assembling a conservation tillage implement comprising: providing a cultivator frame have longitudinally spaced apart transverse cross-members; providing a plurality of individual coulter wheel assemblies; providing a mounting means for each coulter wheel assembly; and, removably mounting the coulter wheel assemblies to the frame using the mounting means to form three or more longitudinally spaced apart rows of laterally spaced apart coulter wheel assemblies, a coulter wheel assembly in a given row being staggered with respect to the coulter wheel assemblies in a longitudinally adjacent row.

According to another aspect of the invention, there is provided a system for conversion of a field working implement between a conservation tillage implement and a conventional tillage implement, the system comprising: a cultivator frame having longitudinally spaced apart transverse cross-members; three or more longitudinally spaced apart rows of laterally spaced apart individual coulter wheel assemblies or field working tools removably mounted to the frame; and, the conversion comprising exchanging field working tools with coulter wheel assemblies, or, exchanging coulter wheel assemblies with field working tools.

According to another aspect of the invention, there is provided a system for mounting a coulter wheel assembly to a cultivator frame comprising: a mounting means comprising opposed first and second flanges for clamping engagement with the frame and a vertically extending hollow strut secured to the first flange, the strut having a pair of opposed horizontal slots therethrough; and, a coulter wheel assembly comprising a vertical shank having a horizontal hole therethrough, the shank secured within the hollow strut by means of a pin extending through the slots and the hole to thereby permit rotational movement of the shank within the hollow strut about a vertical axis.

According to another aspect of the invention, there is provided a method of conservation tillage comprising: providing a field containing standing water, wet soil, and crop residue; providing a conservation tillage implement comprising spaced apart rows of staggered individual coulter wheel assemblies; and, operating the conservation tillage implement in the field through the standing water to cut and size the crop residue.

According to another aspect of the invention, there is provided a method of conservation tillage comprising: providing a field containing crop residue; providing a conservation tillage implement comprising spaced apart rows of staggered individual coulter wheel assemblies; and, operating the conservation tillage implement at speeds in excess of 8 miles per hour to cut and size the crop residue.

The use of individual coulter wheel assemblies provides several advantages as compared with gang-shaft mounted coulter wheels. Maintenance is simplified, as the individual coulter wheel assemblies may be readily replaced without removal of the entire gang shaft. Individual coulter wheel assemblies may be staggered; this reduces the likelihood of plugging with wet soil or crop residue as compared with gang-shaft mounted coulter wheels. The lateral spacing between adjacent assemblies may be adjusted according to soil or crop residue conditions, further reducing the likelihood of plugging. Since plugging is unlikely to occur, scraper blades are not required for the coulter wheel assemblies; this reduces maintenance and further reduces plugging problems as compared with gang-shaft mounted coulter wheels. Individual coulter wheel assemblies may be permitted to deflect upwardly in response to impact with obstacles, as opposed to deflection of an entire gang shaft. This permits the conservation tillage implement to be operated at faster speeds without impact damage. Since each coulter wheel is permitted to spin at a different rate, the implement may be turned at the end of a field while the coulter wheels are engaged with the soil; in comparison, coulter wheels at the ends of a gang-shaft are subjected to shear stresses upon turning when engaged with the soil, leading to pre-mature failure. The ability to turn quickly at the end of a field is enhanced if the coulter wheel assemblies are mounted in a manner that permits rotation of the assembly about a vertical axis, which is not a practical option for gang-shaft mounted coulter wheels. Using individual coulter wheel assemblies saves space overall, allowing multiple rows of coulter wheel assemblies to be mounted on a cultivator frame; this increases the number of times the residue is hit by a coulter wheel as compared with gang-shaft mounted coulter wheels.

A conservation tillage implement is differentiated from a conventional tillage implement in several ways. A conservation tillage implement is used in no-till or minimum tillage applications and is operated at shallow depths whereas a conventional tillage implement is used for working and turning the soil and is operated at deeper depths. In operation, the conservation tillage implement may be drawn at faster speeds and by a tractor with less horsepower as compared with a conventional tillage implement.

The conservation tillage implement of the present invention may be used on a field just after harvest in the fall to break up crop residue, without tilling the earth, to reduce exposure of the soil to winter elements while cutting and sizing the residue to aid in decomposition and conditioning the soil in preparation for planting the next spring. The conservation tillage implement may be operated at depths of 4-6" when used in the fall for residue management. Alternatively, the conservation tillage implement may be operated on frozen soil to cut and size residue without appreciably working the soil. Also, the implement may be used in the spring for seedbed preparation and soil conditioning at about the time of the thaw while the ground is still hard enough to support a tractor but before the ground is dry enough to plant a crop. Use of the implement in the spring further breaks up crop residue and also helps aerate the soil. Aeration of the soil in the spring permits warm air to enter the soil to expedite thawing and to bring the soil up to planting temperature sooner than it would be otherwise. This allows the farmer to plant earlier and to maximize the growing season to increase yield and productivity. The conservation tillage implement may be operated at depths of as little as 1" for seed bed preparation. The conservation tillage implement may also be used prior to liquid manure application for light tillage and residue fluffing, or for incorporation of liquid manure following application. Other uses include: soil leveling; surface crust breaking following heavy rains; encouragement of weed emergence prior to fall burn down; and, improved insect and disease control through residue sizing and disturbance.

Advantageously, a conservation tillage implement according to the present invention may be drawn at faster speeds than other conservation tillage implements or conventional tillage implements. Although there is no theoretical upper limit on speed, the conservation tillage implement according to the present invention may be operated at speeds of from 8-18 miles per hour, preferably from about 8-12 miles per hour. Other conservation tillage implements comprising gang-shaft mounted coulter wheels are typically drawn at speeds of from 6-8 mph, and conventional tillage implements (for example, field cultivators) are typically drawn at speeds of less than 6 mph. Operating at faster speeds causes the crop residue to be cut more finely and reduces the likelihood of becoming stuck in wet soil conditions. Fast operational speeds are made possible in part due to a lack of plugging and low incidence of damage due to impact with obstacles, both of which result from staggered individual coulter wheel assemblies.

Surprisingly, a conservation tillage implement according to the present invention may be operated in extremely wet soil conditions without plugging, even through standing water. This is of particular utility in the cutting and sizing of crop residue from rice farming operations. Heretofore, attempts to utilize other conservation tillage implements or conventional tillage implements have resulted in plugging of the field working tools, particularly gang-shaft mounted coulter wheels, with mud and crop residue. This necessitated drainage of the rice fields and drying of the soil prior to working the field and planting the next successive rice crop. Advantageously, the conservation tillage implement according to the present invention can be operated through standing water without plugging, obviating the need for draining and drying the field. This is in part due to the staggered individual coulter wheel assemblies and due to high operational speeds, which reduce the likelihood of becoming stuck. Impact with non-visible submerged obstacles does not result in damage to the implement and does not cause the operator to stop and become stuck. The conservation tillage implement may be operated at speeds of from 8-15 miles per hour in standing water. The standing water may have a depth of from 0.5-12 inches and may cover substantially the entire field.

The coulter wheel assemblies may be mounted to any part of the cultivator frame. For example, the coulter wheel assemblies may be mounted on the transverse cross-members of the frame. The coulter wheel assemblies may be fixed in a particular position on the transverse cross-members or they may be laterally adjustable on the transverse cross-members. Being laterally adjustable allows the farmer to set a desired distance between the individual coulter wheel assemblies in a given row. Being able to laterally adjust spacing between coulter wheel assemblies in a given row is advantageous since it decreases the likelihood of plugging and allows a farmer to adapt the implement to specific soil types, moisture conditions, or crop residue conditions. Any number of transverse cross-members may be present. Transverse cross-members do not need to be continuous from one side of the cultivator frame to the other. It is possible to have a plurality of transverse cross-members aligned along a common transverse axis but spaced apart laterally. Transverse cross-members that are laterally aligned along a common transverse axis may be considered for descriptive purposes as the same transverse cross-member.

The implement comprises three or more rows of coulter wheel assemblies. Thus, the implement may comprise four or more rows, five or more rows, six or more rows, seven or more rows, etc. Usually, there may be three to eight rows; more particularly, there may be three to six rows. Six rows and eight rows of coulter wheel assemblies are of particular note. A row may comprise a single coulter wheel assembly or a plurality of coulter wheel assemblies. Coulter wheel assemblies are in the same row even if they are mounted on different transverse cross-members, provided the coulter wheel assemblies are aligned along a common transverse axis. Thus, coulter wheel assemblies mounted along a common transverse axis form a row. The coulter wheel assemblies may be longitudinally spaced apart from the transverse cross-members. For example, the coulter wheel assemblies may be mounted to longitudinal extension members mounted to the transverse cross-members of the frame. In this manner, coulter wheel assemblies from more than one row may be mounted to the same transverse cross-member, so that a plurality of rows is provided for a given transverse cross-member.

The coulter wheel assemblies are preferably staggered between adjacent rows so that no two coulter wheel assemblies on longitudinally adjacent rows are in the same longitudinal line. This helps prevent plugging. A coulter wheel assembly in a row two or more rows removed from a first row may or may not be in the same longitudinal line as a coulter wheel assembly in the first row. For example, every second row could have the same longitudinal alignment of coulter wheel assemblies, or every third row could have the same longitudinal alignment, or every fourth row, etc. Preferably, all of the coulter wheel assemblies in a given row are laterally staggered with respect to all of the coulter wheel assemblies in a longitudinally adjacent row. If the coulter wheel assemblies are laterally adjustable on the cross-members, the farmer can use whatever arrangement of staggered rows that is most useful for the particular soil, moisture, or residue conditions. Lateral spacing between coulter wheel assemblies does not need to be consistent between rows; the lateral spacing can be totally random, provided a staggered effect is preserved.

Any suitable coulter wheel assembly may be used as part of the present invention, provided that the assembly is adapted to be removably mounted on a cultivator frame. The coulter wheel assembly is preferably positioned so that the coulter wheel is aligned with the direction of travel to help reduce tractor power requirements. The coulter wheel assembly may comprise a spring element that permits upward deflection of the coulter wheel in response to impact with obstacles. The spring element may comprise, for example, a substantially C-shaped spring, a leaf spring, or a coil spring mounted on an upwardly extending shaft that is deformed upon deflection of the coulter wheel. Preferably, the coulter wheel assembly disclosed in U.S. Pat. No. 6,412,571, the disclosure of which is hereby incorporated by reference, may be used. This coulter wheel assembly comprises a coil spring with a horizontal spring axis having upper and lower shank members extending tangentially therefrom. In operation, the lower shank member is permitted to deflect upwardly in response to impact with an obstacle, thereby reducing the load transmitted to the mounting means and reducing the likelihood of damage to the coulter wheel assembly and the implement.

Any suitable mounting means may be used to removably mount the individual coulter wheel assemblies on to the cultivator frame. The mounting means may comprise, for example, a bracket that may be used to mount the coulter wheel assemblies on to the transverse cross-members of the frame. Although the mounting means may be fixed to the frame (for example, by welding or bolting), the mounting means preferably permits lateral adjustment of the coulter wheel assembly. The mounting means may include a clamping means having first and second flange members for clamping engagement with the top and bottom of a frame member. The first and/or second flange may be attached to a vertically extending hollow strut for receiving, for example, an upper shank member of the coulter wheel assembly. The mounting means may permit rotational movement of the coulter wheel assembly about a vertical axis. This allows the coulter wheel assembly to move in response to directional changes of the implement, thereby reducing the load transmitted to the mounting means and further reducing the likelihood of damage to the coulter wheel assembly and the implement. Rotational movement about a vertical axis also facilitates turning the implement at the end of the field with the coulter wheels fully engaged with the ground without causing undue gouging of the earth or damaging the implement.

Due to the possibility for rotational movement of the coulter wheel assemblies about a vertical axis, the implement is not constrained to movement in a straight line direction and may have a tendency to steer more widely than desired when turned at the end of a field. This may be addressed by providing a portion of the mounting means without the means to permit rotational movement of the coulter wheel assembly. Also, if a coulter wheel assembly having a coil spring with a horizontal spring axis is used, it is desirable to orient the coils oppositely on opposite sides of the implement to help alleviate any potential problem of sideways drift that may occur during operation. Put differently, if coils that are wound clockwise are provided on one side of the implement, coils that are wound counter-clockwise should be provided on the opposite side of the implement.

Any suitable coulter wheel may be used in a coulter wheel assembly. Although any suitable number of coulter wheels may be provided as part of an individual coulter wheel assembly, it is preferable that a single coulter wheel is provided, as this increases flexibility in coulter wheel spacing. The coulter wheel is typically vertical, although it may be placed at an angle to the vertical in certain conditions. A straight coulter wheel or preferably a fluted coulter wheel may be used; these types of coulter wheels are well-known in the art. A coulter wheel with wavy acutely angled flutes may be used; for example, the coulter wheel disclosed in U.S. Pat. No. 5,649,602, the disclosure of which is hereby incorporated by reference. This type of coulter wheel comprises a plurality of waves, each wave comprising a crest and valley oriented at an acute angle to the radius of the wheel. The angle is selected so that, in operation, the crest and valleys enter the soil with a nearly vertical orientation in an effort to reduce the power required to draw the implement.

The cultivator frame is advantageously a standard cultivator frame, although it is possible to use a specially designed frame. Any suitable cultivator frame may be used. For example, the cultivator frame could comprise a plurality of longitudinal and transverse rectangular steel tubes formed into a generally rectangular frame, for example by welding, the frame having ends and sides. The transverse rectangular steel tubes of the frame may be the transverse cross-members on which the coulter wheel assemblies are mounted. The frame may comprise a central portion with two sides and a wing portion hingedly attached to each side, each wing portion having a corresponding hydraulic cylinder means mounted to the central portion and each wing portion able to pivot from a horizontal ground working orientation to a vertical transport orientation upon actuation of the hydraulic cylinder means. Alternatively, the cultivator frame may comprise a plurality of transverse cross-members on a center spine. The cultivator frame is equipped with a coupling mechanism, or tongue, for hitching the cultivator frame to a draw bar of a tractor. The cultivator frame may additionally be equipped with a rear coupling mechanism for hitching additional implements to the rear of the frame.

The cultivator frame further comprises a set of wheels to facilitate movement of the frame over the ground. The set of wheels is height adjustable to adjust the depth at which the implement is operated. Any suitable means may be used to adjust the wheel height, for example, hydraulic cylinders, etc. Preferably, the wheels are provided in pairs that are longitudinally spaced apart. Each pair of wheels may be mounted on a longitudinal axle mounting member that is mounted to the frame at a point between the wheels, allowing the wheels to pivot in response to obstacles. This is commonly known as a walking axle arrangement. The wheels in each pair may be staggered and may be mounted on opposite sides of the axle mounting member. The walking axle arrangement allows the implement to traverse obstacles or ruts in the field one wheel at a time, thereby reducing the likelihood of jarring the implement and causing damage thereto as compared with wheels arranged in a row. The walking axle arrangement thereby allows the implement to be operated at faster speeds without suffering mechanical damage. In addition, staggering the wheels reduces the likelihood of plugging between the wheels with mud, which is particularly advantageous in wet soil conditions and when operating the apparatus through standing water.

A conservation tillage implement may further comprise, in addition to three or more staggered rows of coulter wheel assemblies, one or more individual field working tools. The field working tools may comprise, for example, S-tine assemblies or C-shaped shank assemblies. The field working tools may comprise a shank member and a ground engaging member. The shank member may comprise a spring element. The ground engaging member may comprise a chisel plow point, a triangular or V-shaped shovel, or a sub-soiling tooth. A field working tool may also be referred to as a tillage tool. A plurality of different types of field working tools may be provided in a given row and the field working tools may be interspersed with coulter wheel assemblies. The field working tools may be located in longitudinally spaced apart rows. The field working tools may be laterally adjustable. The field working tools in a given row may be staggered with respect to other field working tools or coulter wheel assemblies in a longitudinally adjacent row. The selection of the appropriate type, number, or spacing of field working tools or coulter wheel assemblies is at the discretion of the farmer and may be based upon the soil, crop residue, or moisture conditions.

Field working tools may be mounted on the cultivator frame by any suitable means. For example, the field working tools may be bolted directly to the frame, clamped to the frame, or attached to the frame by a mounting means. A mounting means similar to the one previously described in the removable mounting of coulter wheel assemblies may be used. The field working tools may be mounted to the transverse cross-members of the frame and/or may be mounted using longitudinal extension members so that the field working tools are longitudinally spaced apart from the transverse cross-members.

The conservation tillage implement may also comprise conventional leveling attachments at the rear of the cultivator frame. The leveling attachments may be mounted to a rear transverse cross-member of the frame. Conventional leveling attachments may comprise, for example, spike harrows, leveling bars, rotary harrows, etc., which are dragged behind the cultivator frame to level the field after the field is worked by the coulter wheel assemblies or other field working tools. Conventional leveling implements (for example, a rotary packer) may additionally or alternatively be hitched to the rear of the conservation tillage implement using the rear coupling mechanism.

A conservation tillage implement may be assembled according to the following method. A cultivator frame is provided having longitudinally spaced apart transverse cross-members. The cultivator frame may be an existing cultivator frame or one provided especially for the purpose of assembling a conservation tillage implement. A plurality of coulter wheel assemblies are provided along with a mounting means for mounting each coulter wheel assembly to the cultivator frame. The coulter wheel assemblies are then removably mounted to the cultivator frame using the mounting means to form three or more longitudinally spaced apart rows of laterally spaced apart coulter wheel assemblies. The coulter wheel assemblies are positioned on the frame such that coulter wheel assemblies in a given row are staggered with respect to coulter wheel assemblies in a longitudinally adjacent row. The method may be performed in conjunction with a kit to create a conservation tillage implement.

A kit may be provided to make a conservation tillage implement from an existing cultivator frame. The kit may comprise: a plurality of coulter wheel assemblies; a plurality of mounting means for mounting the coulter wheel assemblies to the cultivator frame; and, a set of instructions for mounting the coulter wheel assemblies to the cultivator frame using the mounting means. The instructions may provide for the mounting of coulter wheel assemblies in three or more longitudinally spaced apart rows and for staggering the coulter wheel assemblies in a given row with respect to the coulter wheel assemblies in a longitudinally adjacent row. The instructions in the kit may include the steps of the method. Any suitable number of coulter wheel assemblies may be provided as part of the kit. The coulter wheel assemblies are mounted to the existing cultivator frame using the mounting means provided with the kit. The number of mounting means is at least equal to the number of coulter wheel assemblies. A conservation tillage implement comprising additional field working tools may be created using the kit. In order to install the coulter wheel assemblies on an existing cultivator frame, the ground clearance of the frame may need to be increased. The kit may further comprise stilt means for increasing the ground clearance of the frame and instructions for installation of the stilt means. Hydraulic cylinder means with a longer stroke length than any existing hydraulic cylinders on the cultivator frame may also be provided as part of the kit.

The kit may be used in the conversion of a conventional tillage implement to a conservation tillage implement, although the conversion may also be performed without the kit. A conventional tillage implement comprising a cultivator frame and a plurality of field working tools may be converted to a conservation tillage implement by exchanging some or all of the field working tools with coulter wheel assemblies to form three or more rows of staggered coulter wheel assemblies. The reverse conversion from a conservation tillage implement to a conventional tillage implement may also be performed. A stilt means and/or hydraulic cylinder means may be employed in the conversion, depending on the ground clearance of the cultivator frame. The method of assembling described above may be employed in the conversion of a conventional tillage implement to a conservation tillage implement and may additionally comprise the steps of removing some or all of the existing field working tools from the conventional tillage implement. In this manner, an existing conventional tillage implement can be retrofitted with coulter wheel assemblies, thereby reducing a farmer's expense in obtaining the conservation tillage implement.

The conversion provides a number of practical advantages. A single cultivator frame is used for both the conventional tillage implement and the conservation tillage implement; this results in considerable cost savings to the farmer, since an extra piece of purpose-built equipment is not needed. There is no timing conflict between the conservation tillage and conventional tillage operations, since these operations are performed at different times of the year. In addition, dealers can stock frames and components separately and can build either a conventional or a conservation tillage implement on demand, thereby reducing inventory costs and delivery time. A single, multi-purpose implement provided by the system of the present invention offers great flexibility and cost savings to the farmer, dealers, and equipment manufacturers.

A system for mounting a coulter wheel assembly to a cultivator frame comprises a mounting means as previously described that permits rotational movement of the coulter wheel assembly about a vertical axis. The coulter wheel assembly has an upper shank that is inserted into the hollow strut and secured therewithin by means of a horizontal pin extending through a hole in the upper shank member and through opposed horizontal slots in the strut. The coulter wheel assembly may be removed from the mounting means by removal of the pin. The rotational movement of the coulter wheel assembly is constrained by the slot. The rotational movement may be constrained so as not to exceed the maximum turning radius of the conservation tillage implement. The rotational movement may be constrained to +/−30°, preferably +/−23°. The mounting means may be mounted to the frame by clamping and may be removed from the frame. The system may be employed by first installing the mounting means on the frame, then installing the coulter wheel assembly within the mounting means; alternatively, the mounting means may be first installed on the coulter wheel assembly, then installed on the frame.

BRIEF DESCRIPTION OF THE DRAWINGS

In order that the invention may be more clearly understood, preferred embodiments thereof will now be described in detail by way of example, with reference to the accompanying drawings, in which:

FIG. 3 is a side view of the left-side coulter wheel assembly of FIG. 2a with a mounting means for use with the present invention;

DETAILED DESCRIPTION OF PREFERRED EMBODIMENTS

Figure 1:
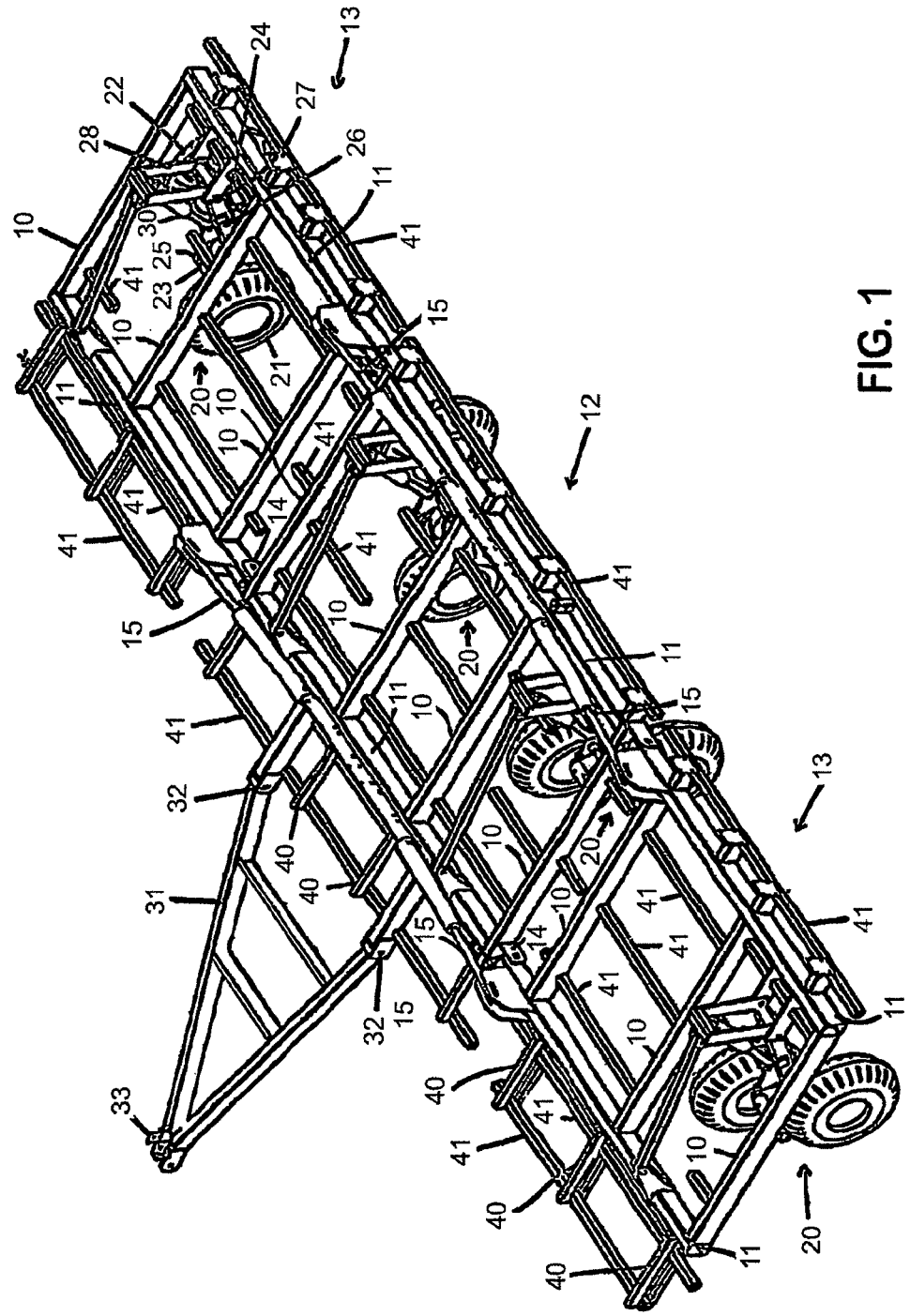
FIG. 1 is a perspective view of a cultivator frame for use with the present invention; g

Throughout the description, like reference numerals will be used to refer to like features of the invention.

Referring to FIG. 1, a cultivator frame comprises a plurality of longitudinal 10 and transverse 11 rectangular steel tubes welded together to form a generally rectangular structure. The cultivator frame comprises a central portion, generally denoted as 12, and two wing portions, generally denoted as 13. Each wing portion 13 is attached to a side of the central portion 12 by means of hinges 14. Each wing portion 13 has a corresponding hydraulic cylinder means 15 mounted to the central portion 12 and operatively connected to each wing portion. Each wing portion 13 is able to pivot from a horizontal ground working orientation to a vertical transport orientation upon actuation of the hydraulic cylinder means 15.

The cultivator frame has a set of wheels comprising four laterally spaced apart pairs of wheels 20. Only one such pair of wheels is labeled in detail. Each pair of wheels 20 comprises a first wheel 21 that is longitudinally spaced apart and laterally staggered with respect to a second wheel 22. Each wheel is mounted to a stub axle member (23, 24, respectively) that is attached to a longitudinal axle mounting member 25. This is commonly referred to as a walking axle arrangement. A lever arm 26 is pivotally attached at its lower end to the longitudinal axle mounting member 25 between the first wheel 21 and the second wheel 22. The lever arm 26 is also pivotally attached at its upper end to the frame at wheel hinge 27. An upright stanchion 28 is pivotally attached to the wheel hinge 27. A constraint arm 29 is pivotally attached to an upper portion of the stanchion 28. Hydraulic wheel cylinder 30 is pivotally attached at its lower end to the lever arm 26 and at its upper end to the upper part of the stanchion 28. To raise the frame, the wheel cylinder 28 is extended, causing the lower end of the lever arm 26 to arcuately move downwardly. This causes the frame to rotate upwardly about the pivot point of the lever arm 26 with the longitudinal axle mounting member 25. The movement of the frame in turn causes the upper part of the stanchion 28 to pivot downwardly as the frame moves upwardly. The pivoting of the stanchion causes the upper end of the hydraulic wheel cylinder 30 to move forwardly, thereby maintaining a suitable angle between the hydraulic wheel cylinder 30 and the lever arm 26 so that the cylinder has sufficient mechanical advantage to continue the pivoting action of the lever arm 26. The use of the stanchion 28 allows a hydraulic wheel cylinder 30 to be used that has a shorter stroke than would otherwise be necessary to attain the desired range of frame heights.

The cultivator frame has a coupling mechanism 31 at the front thereof for hitching the implement to the drawbar of a tractor (not shown). The coupling mechanism 31 is pivotally attached to the frame at tongue hinge 32. A tongue constraint (which has been omitted for clarity) is pivotally attached to the coupling mechanism 31 at constraint hinge 33. The tongue constraint prevents the coupling mechanism 31 from drooping and maintains a desired angular relationship between the coupling mechanism 31 and the frame. A plurality of rear mounting flanges 34 are provided for mounting of leveling attachments (not shown) to the rear of the frame.

The frame further comprises a plurality of longitudinal frame members 40 and transverse cross-members 41, only some of which are labeled, attached to the longitudinal 10 and transverse 11 rectangular steel tubes. In some cases, the longitudinal frame members 40 and transverse cross-members 41 are supported at both ends, whereas in other cases they are cantilevered. Coulter wheel assemblies (not shown in FIG. 1) and field working tools (not shown in FIG. 1) may be mounted to the longitudinal frame members 40 and the transverse cross-members 41. In some instances, a plurality of transverse cross-members 41 are aligned along a common transverse axis.

Figure 2A:
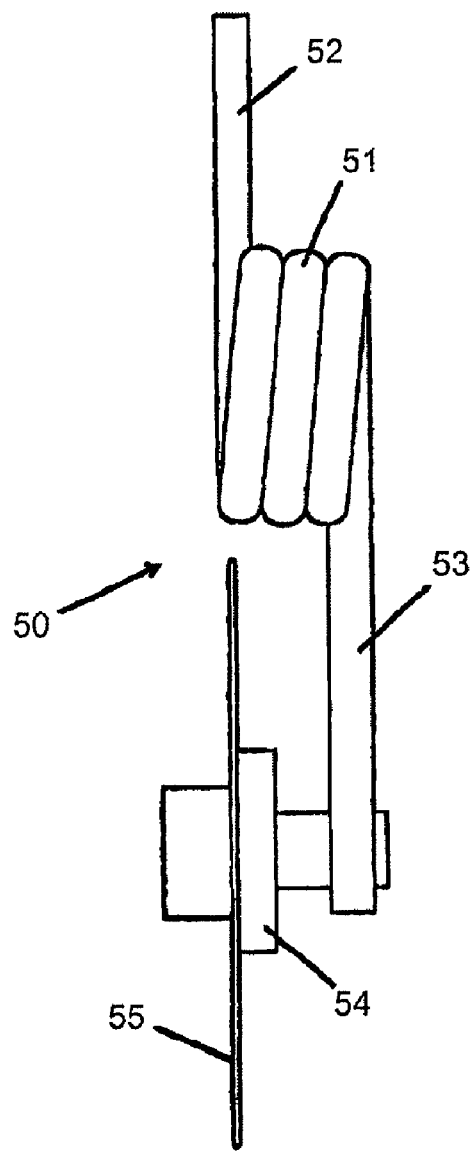
FIG. 2a is a front view of a left-side coulter wheel assembly for use with the present invention.
Figure 2B:
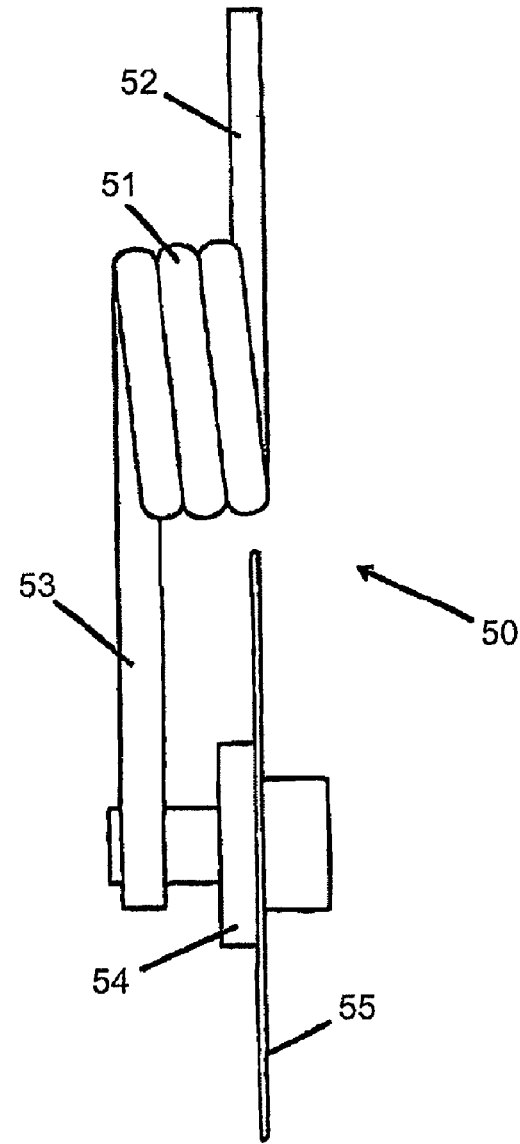
FIG. 2b is a front view of a right-side coulter wheel assembly for use with the present invention.

FIGS. 2a and 2b show examples of left and right-side coulter wheel assemblies, respectively, that may be used in the present invention. These coulter wheel assemblies are similar to those described in U.S. Pat. No. 6,412,571. Each coulter wheel assembly 50 comprises a shank having a coil spring portion 51, an upper shank portion 52 and a lower shank portion 53, both shank portions extending tangentially from the coil spring portion 51. The coil spring portion 51 has a horizontal spring axis passing therethrough and permits the upper and lower shank portions 52, 53 to move relative to one another about the spring axis, for example in response to impact with obstacles. When viewed from the left, the coil spring of the left-side coulter wheel assembly (shown in FIG. 2a) is wound counter-clockwise, whereas the coil spring of the right-side coulter wheel assembly (shown in FIG. 2b) is wound clockwise. The upper shank portion 52 is for mounting the coulter wheel assembly to the cultivator frame. The lower shank portion 53 has a rotatable hub 54 rotatably attached thereto. A coulter wheel 55 is mounted to the rotatable hub 54.

Figure 4:
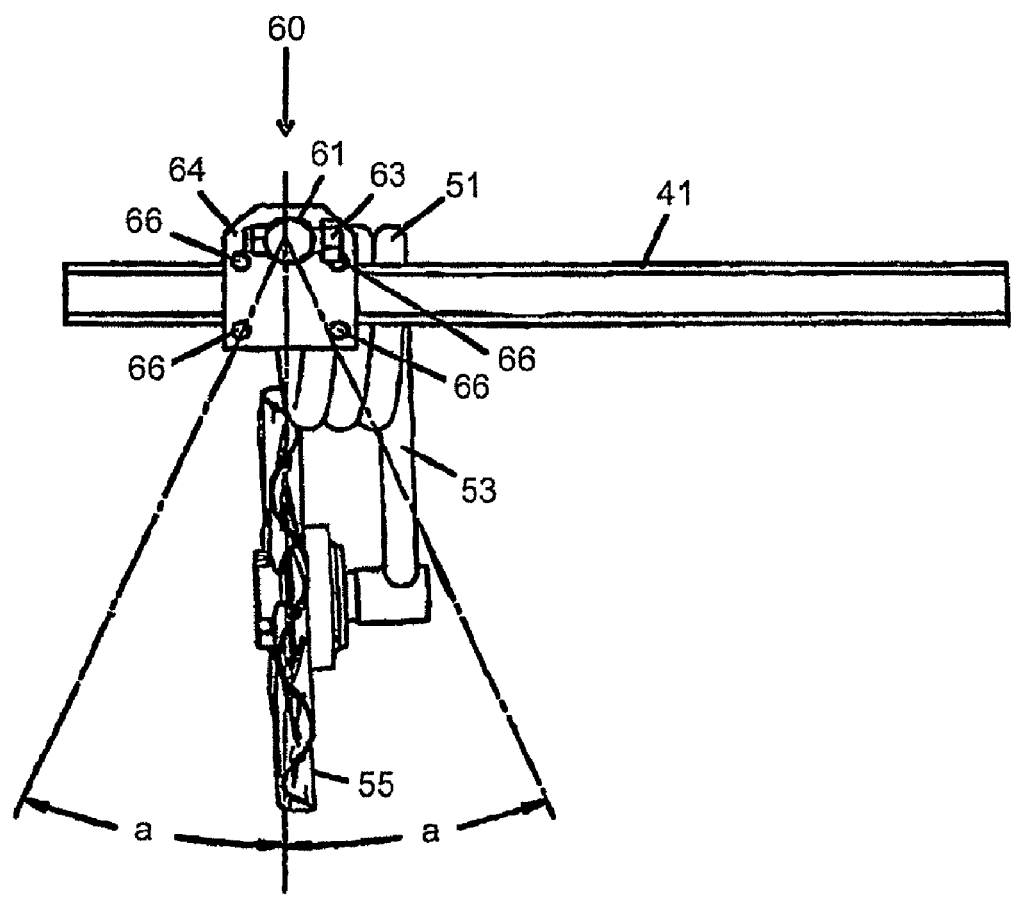
FIG. 4 is a top view of the left-side coulter wheel assembly and mounting means of FIG. 3 with a fluted coulter wheel.

Referring to FIGS. 3 and 4, the coulter wheel assembly of FIG. 2a is shown with a mounting means, generally denoted as 60, for mounting the coulter wheel assembly to one of the transverse cross-members 41. Although a straight coulter wheel 55 is shown in FIG. 3, a fluted coulter wheel 55 may also be used with the coulter wheel assembly, as shown in FIG. 4. The coil spring 51 permits the lower shank portion 53 to deflect upwardly about the horizontal spring axis in response to impact with obstacles.

The mounting means 60 comprises a vertically extending hollow strut 61 for receiving the upper shank portion 52. The hollow strut 61 has two opposed horizontal slots 62 for alignment with a horizontal hole in the upper shank portion 52. A bolt or pin 63 is inserted through the slots 62 and the hole in the upper shank member to secure the upper shank portion 52 within the hollow strut 61, thereby attaching the coulter wheel assembly 50 to the mounting means 60. The horizontal slots 62 permit the coulter wheel assembly 60 to rotate about a vertical axis aligned with the upper shank portion 52 and the hollow strut 61. The slots 62 are sized so that the rotation of the coulter wheel assembly 50 is limited by engagement of the pin 63 with the ends of the slots to an angle a corresponding to the maximum turning angle of the implement without interference between the coupling mechanism and the tractor. In the embodiment shown, the angle a is 23.degree. The hollow strut 61 is secured to a first flange 64 and slidably fitted with a second flange 65. In an alternative embodiment, the hollow strut 61 may be secured to both the first and second flanges 64, 65. The first and second flanges 64, 65 are positioned above and below the transverse cross-member 41 and clamped thereto by tightening of lag bolts 66. Loosening lag bolts 66 allows the position of the mounting means 60 and coulter wheel assembly 50 to be laterally adjusted on the transverse cross-member 41.

Figure 5:
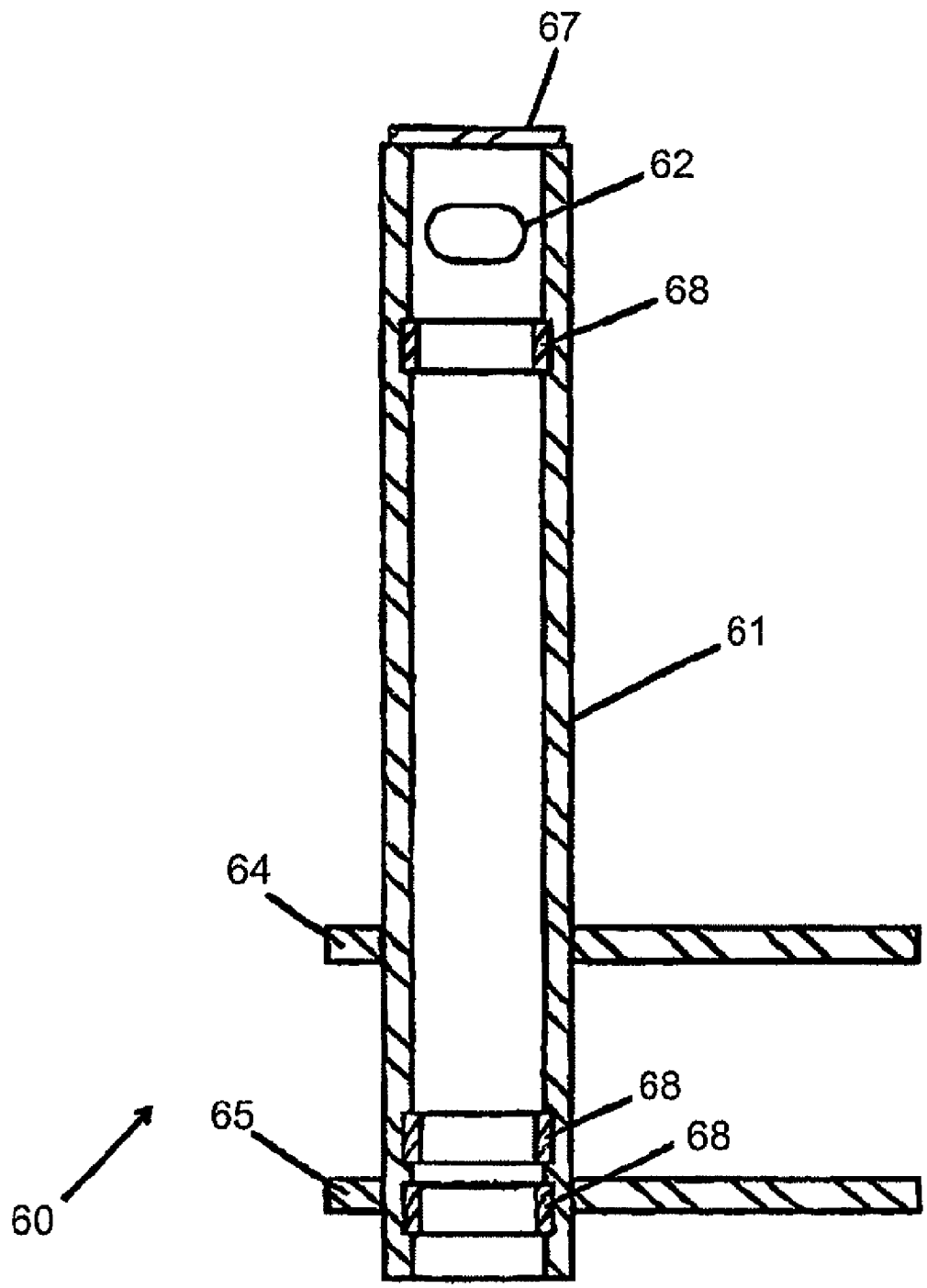
FIG. 5 is a side-sectional view of the mounting means of FIG. 3.

FIG. 5 shows a sectional view of the mounting means 60. The upper shank member 52 (not shown in FIG. 5) is inserted within the hollow strut 61 until it engages upper cap 67. The upper cap 67 is welded to the hollow strut 61 and receives the majority of the upward force when the coulter wheel assembly 50 is engaged with the ground. The pin 63 (not shown in FIG. 5) is thereby permitted to ride freely within the slot 62. The interior of the hollow slot 61 comprises ring-shaped recesses for receiving bushings 68. The bushings 68 are made of a graphite-impregnated nylon material and provide a dry lubricant surface against which the upper shank member 52

(not shown in FIG. 5) rotates. The bushings 68 are wear-resistant, do not require grease, and are not readily fouled by dust.

Figure 6:
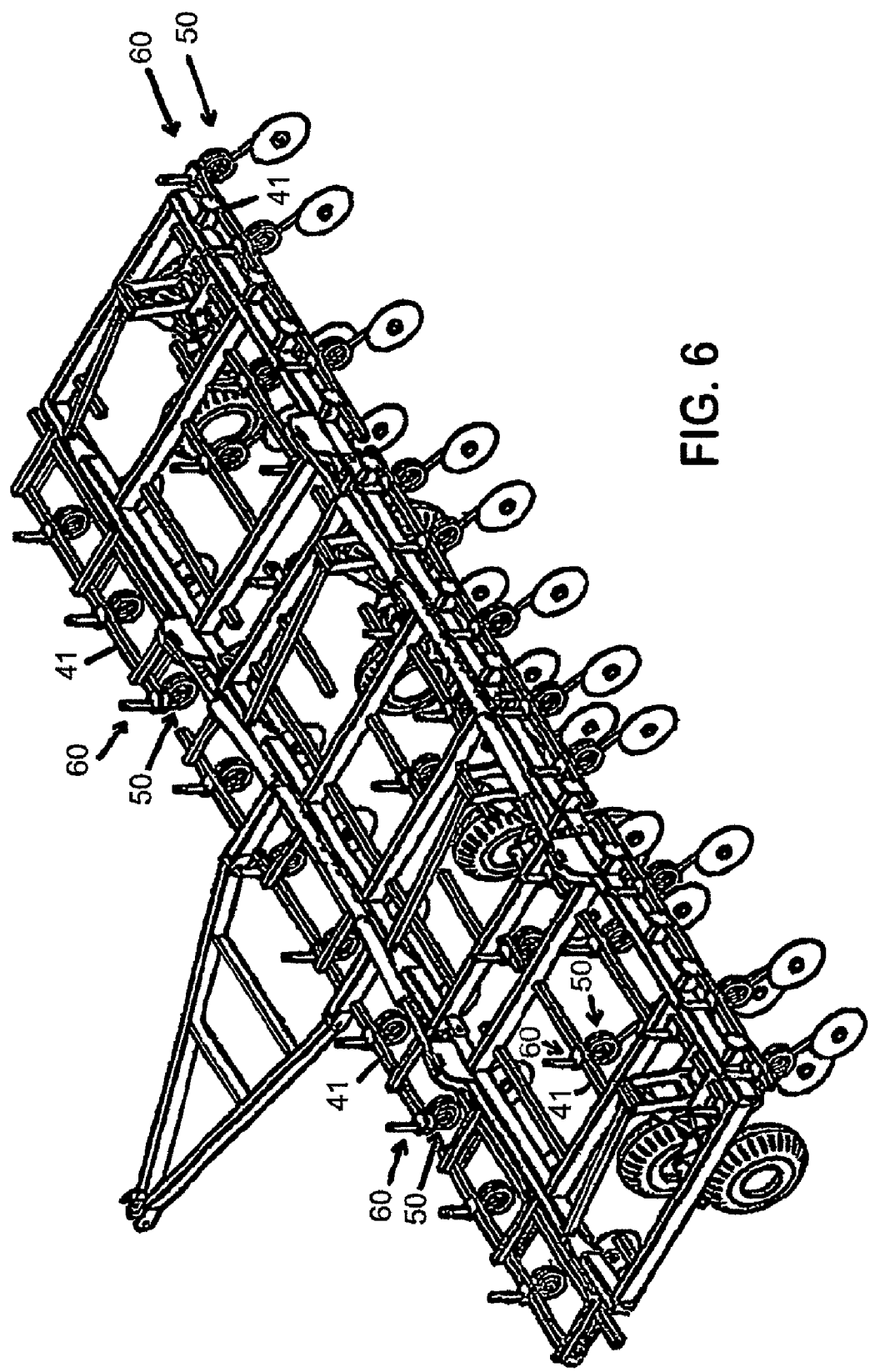
FIG. 6 is a perspective view of an embodiment of a conservation tillage implement of the present invention.

Turning to FIG. 6, an embodiment of a conservation tillage implement of the present invention is described with reference to elements of FIGS. 1-5. The cultivator frame is the frame described with reference to FIG. 1 and functions in the same manner. Individual coulter wheel assemblies 50 are removably mounted to transverse cross-members 41 using mounting means 60, only some of which are labeled. The coulter wheel assemblies 50 are laterally spaced apart and are mounted in longitudinally spaced apart rows. All of the coulter wheel assemblies 50 in a given row are laterally staggered with respect to all of the coulter wheel assemblies in a longitudinally adjacent row. For each row of coulter wheel assemblies, a plurality of transverse cross-members 41 are aligned along a common transverse axis.

Figure 7:
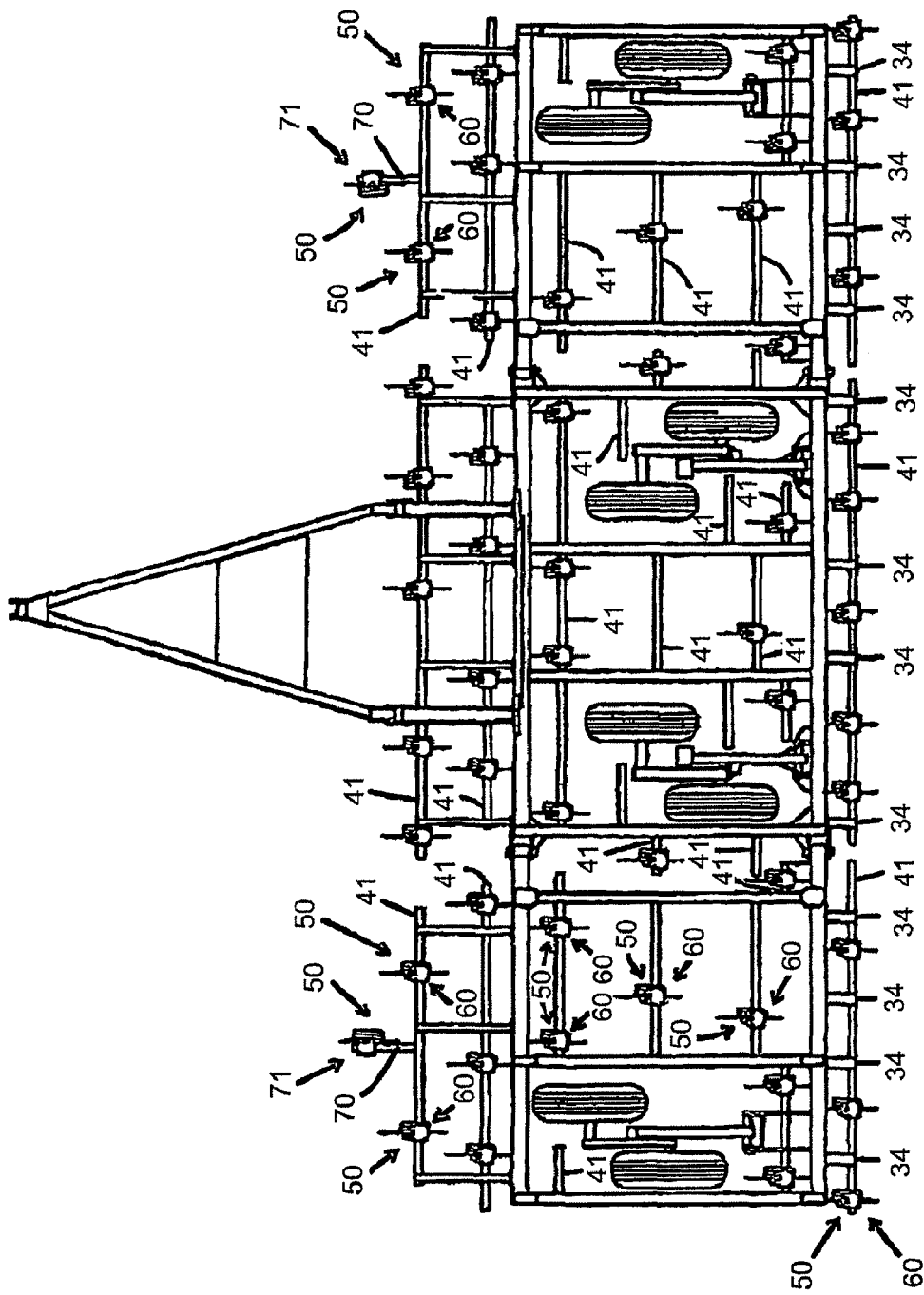
FIG. 7 is a top view of another embodiment of a conservation tillage implement of the present invention.

In FIG. 7, another embodiment of a conservation tillage implement of the present invention is described with reference to elements of FIGS. 1-5. Individual coulter wheel assemblies 50 are removably mounted to transverse cross-members 41 using mounting means 60, only some of which are labeled. Eight longitudinally spaced apart rows of laterally spaced apart individual coulter wheel assemblies 50 are shown. Some of the transverse cross-members 41 are shown without coulter wheel assemblies 50. When viewed from the front of the implement, the left side (which is on the right when viewed from above) has left-side coulter wheel assemblies (as shown in FIG. 2a) and the right side (which is on the left when viewed from above) has right-side coulter wheel assemblies (as shown in FIG. 2b). A longitudinal extension member 70 is shown mounted to a transverse cross-member 41. A coulter wheel assembly 50 is mounted to the longitudinal extension member 70 by mounting means 71. The mounting means 71 is similar to the mounting means 60 in all respects except that the horizontal slots 62 are transposed 90.degree. about the vertical axis. This allows rotational movement of the coulter wheel assembly 50 attached to the mounting means 71 to be in a similar angular relationship to the rotational movement of the other coulter wheel assemblies about the vertical axis. The longitudinal extension member 70 may be of any length and permits two or more rows of coulter wheel assemblies 50 to be mounted to the same transverse cross-member 41. A plurality of rear mounting flanges 34 are provided for the optional mounting of leveling attachments (not shown in FIG. 7) to the rear of the frame.

Figure 8:
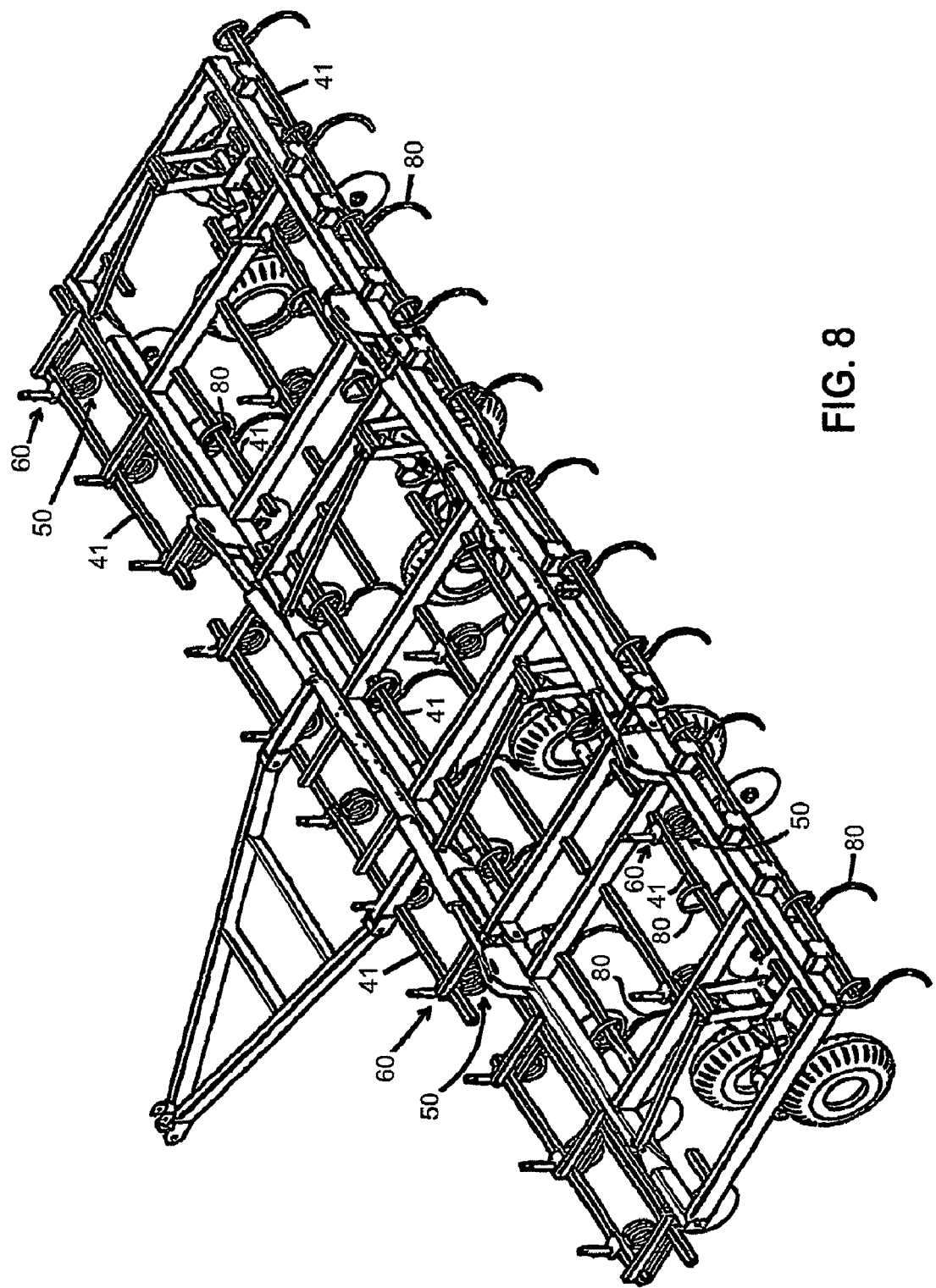
FIG. 8 is a perspective view of another embodiment of a conservation tillage implement of the present invention, further comprising S-tine assemblies.

In FIG. 8, another embodiment of a conservation tillage implement of the present invention is described with reference to elements of FIGS. 1-5. The cultivator frame is the frame described with reference to FIG. 1 and functions in the same manner. Individual coulter wheel assemblies 50 are removably mounted to transverse cross-members 41 using mounting means 60, only some of which are labeled. The coulter wheel assemblies 50 are laterally spaced apart and are mounted in longitudinally spaced apart rows. Each coulter wheel assembly 50 is laterally spaced apart with respect to the coulter wheel assemblies in a longitudinally adjacent row. The conservation tillage implement further comprises a plurality of S-tine assemblies 80 removably mounted to the transverse cross-members 41 and interspersed with the coulter wheel assemblies 50. Each S-tine assembly 80 is made from a resilient spring steel. The S-tine assemblies 80 are arranged in longitudinally spaced apart rows. A row of S-tine assemblies 80 is mounted along a common transverse axis with a row of coulter wheel assemblies 50. The S-tine assemblies 80 in a given row are staggered with respect to the coulter wheel assemblies 50 (and/or S-tine assemblies 80, where applicable) in a longitudinally adjacent row. The position of the S-tine assemblies 80 is laterally adjustable on the transverse cross-members 41.

Figure 9:
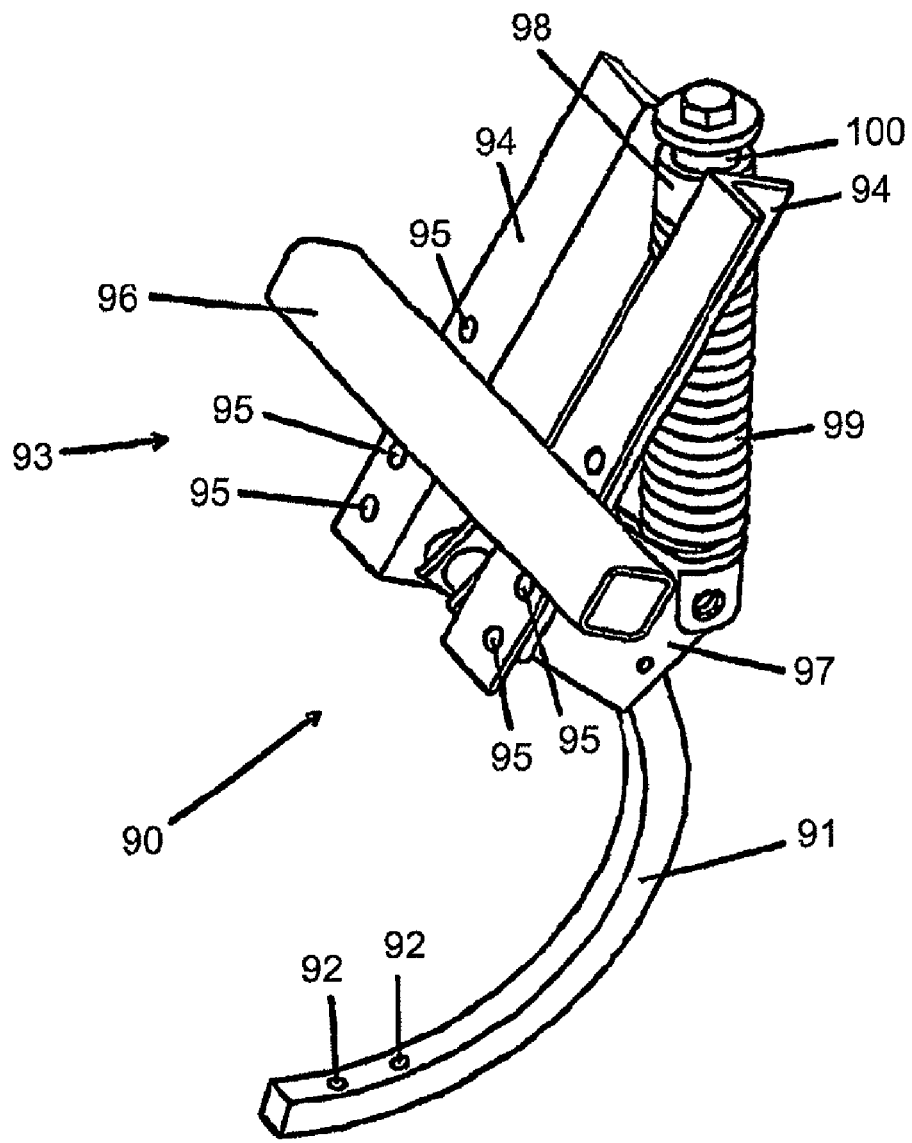
FIG. 9 is a perspective view of a C-shaped shank assembly for use with the present invention.

Referring to FIG. 9, a C-shaped shank assembly 90 for use in the present invention is described. A C-shaped shank member 91 has at its lower end a pair of holes 92 for attachment of a ground engaging member (not shown) thereto. The C-shaped shank member 91 is pivotally attached at its upper end to a mounting means, generally shown as 93, comprising a pair of L-shaped flanges 94, each flange having a complementary set of vertically aligned mounting holes 95. A horizontal square tube 96 is secured to each L-shaped flange 94 and prevents the flanges from rotating relative to one another. When mounted to a transverse cross-member 41 (not shown in FIG. 9), the horizontal square tube 96 rests against an upper surface of the transverse cross-member, vertically supporting the C-shaped shank assembly 90. A U-shaped clevis (not shown) having a pair of free threaded ends is placed over the transverse cross-member 41 so that the free threaded ends are longitudinally inserted through a pair of holes 95 from a given set of holes, a clevis being provided for each L-shaped flange 94. Nuts (not shown) are tightened on to the free threaded ends to clamp the L-shaped flanges 94 against a rear surface of the transverse cross-member 41. A shank flange 97 is mounted to the C-shaped shank member 91 below its pivotal attachment to the L-shaped flanges 94. An upwardly extending shaft 100 is pivotally attached at its lower end to the shank flange 97 and at its upper end to the L-shaped flanges 94 by means of trunnion collar 98. A coil spring 99 is captivated between the shank flange 97 and the trunnion collar 98 and is compressed upon upward deflection of the C-shaped shank member 91 as the shaft 100 slides within the trunnion collar. The mounting means 93 described herein may be used as an alternative to the mounting means 60 in mounting field working tools or coulter wheel assemblies to the cultivator frame.

Figure 10:
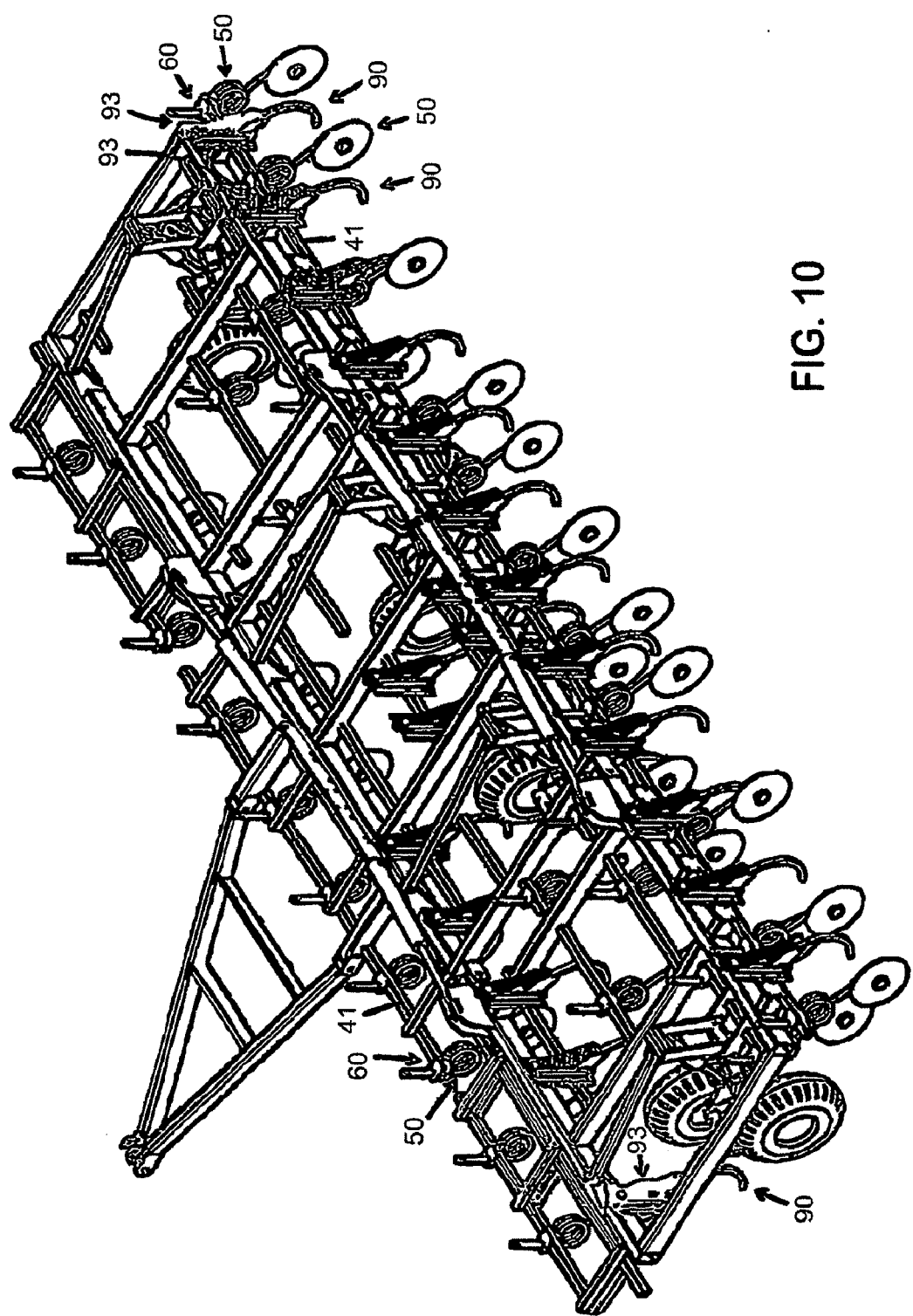
FIG. 10 is a perspective view of another embodiment of a conservation tillage implement of the present invention, further comprising the C-shaped shank assembly of FIG. 9.

In FIG. 10, another embodiment of a conservation tillage implement of the present invention is described with reference to elements of FIGS. 1-5. The cultivator frame is the frame described with reference to FIG. 1 and functions in the same manner. Individual coulter wheel assemblies 50 are removably mounted to transverse cross-members 41 using mounting means 60, only some of which are labeled. The coulter wheel assemblies 50 are laterally spaced apart and are mounted in longitudinally spaced apart rows. Each coulter wheel assembly 50 is laterally spaced apart with respect to the coulter wheel assemblies in a longitudinally adjacent row. The conservation tillage implement further comprises a plurality of C-shaped shank assemblies 90 removably mounted to the transverse cross-members 41 and interspersed with the coulter wheel assemblies 50. Each C-shaped shank assembly 90 is mounted using mounting means 93. The C-shaped shank assemblies 90 are arranged in longitudinally spaced apart rows. A row of C-shaped shank assemblies 90 is mounted along a common transverse axis with a row of coulter wheel assemblies 50. The C-shaped shank assemblies 90 in a given row are staggered with respect to the coulter wheel assemblies 50 (and/or C-shaped shank assemblies 90, where applicable) in a longitudinally adjacent row. The position of the C-shaped shank assemblies 90 is laterally adjustable on the transverse cross-members 41.

Figure 11:
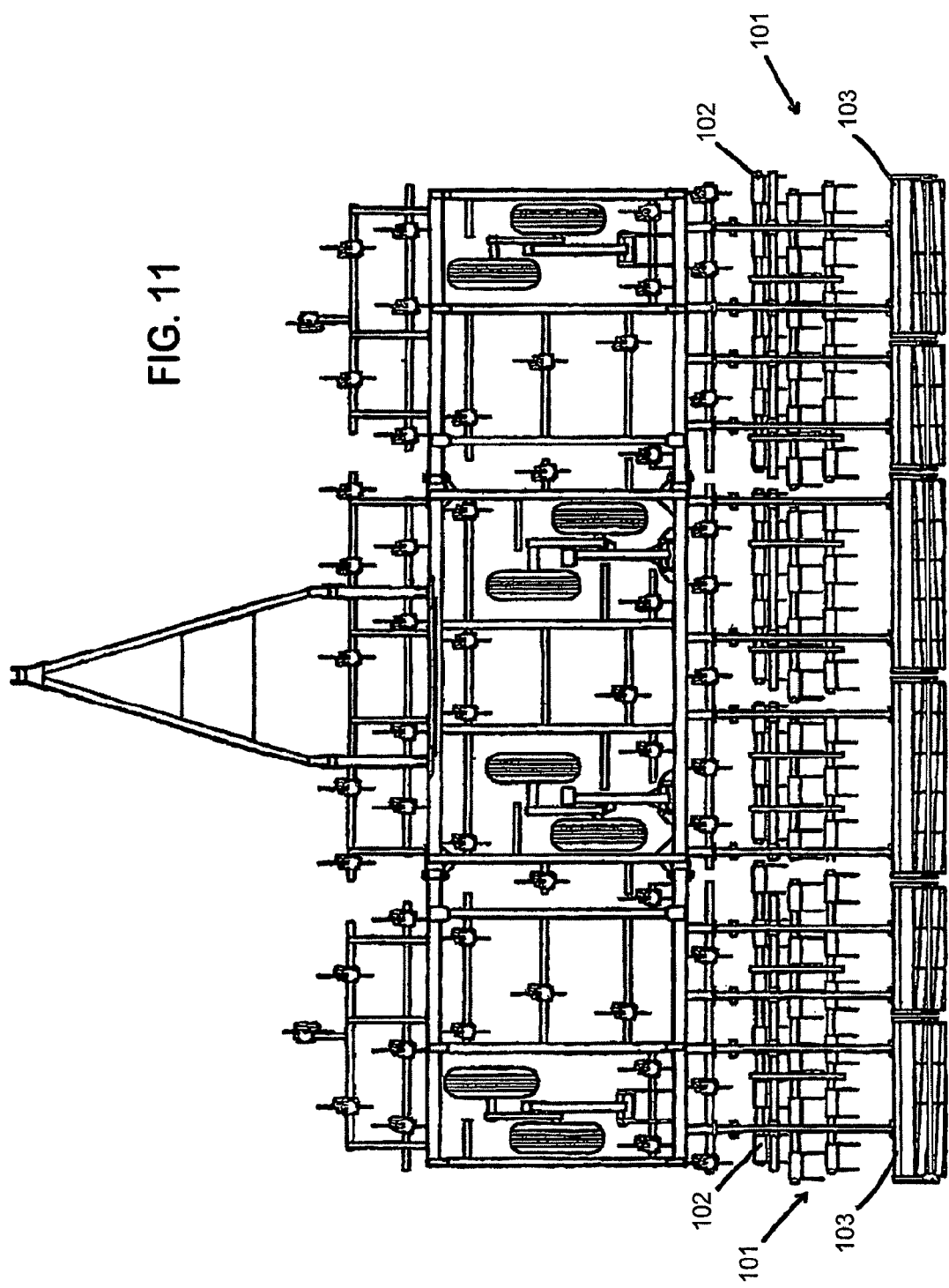
FIG. 11 is a top view of the embodiment of the conservation tillage implement shown in FIG. 7, further comprising leveling attachments mounted to the rear of the frame.

Referring to FIG. 11, the embodiment of the conservation tillage implement described with reference to FIG. 7 is shown with leveling attachments, generally denoted as 101, mounted to the rear of the frame. A set of spike harrows 102 is mounted to the rear of the frame using mounting flanges 34. A set of rolling harrows 103 is also mounted to the rear of the frame using mounting flanges 34. The spike harrows 102 and rolling harrows 103 are used to further kink and break the crop residue to aid in decomposition and to level the soil following the coulter wheel assemblies 50.

Figure 12:
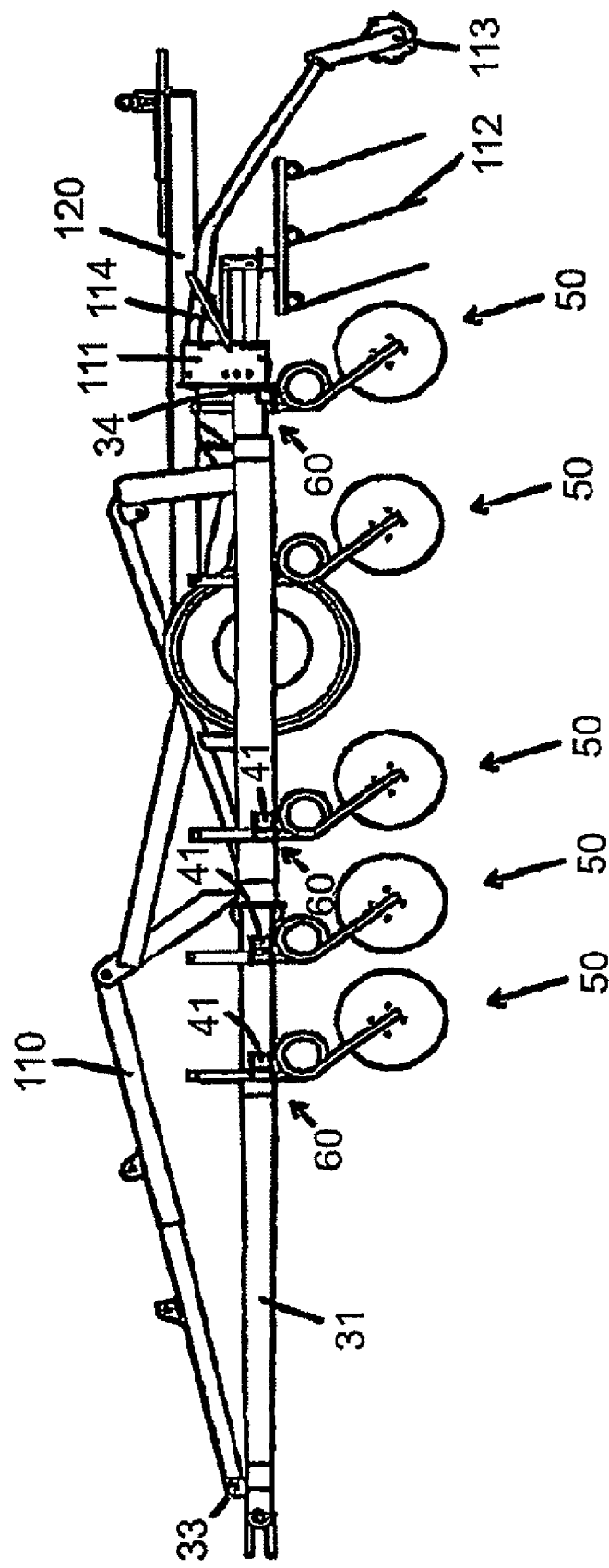
FIG. 12 is a side view of another embodiment of a conservation tillage implement, further comprising leveling attachments mounted to the rear of the frame and a rear coupling mechanism; and, FIG. 13 is a side view of an alternative coulter wheel assembly for use with the present invention.

Referring to FIG. 12, In FIG. 10, another embodiment of a conservation tillage implement of the present invention is described with reference to elements of FIGS. 1-5. Individual coulter wheel assemblies 50 are removably mounted to transverse cross-members 41 using mounting means 60. Five longitudinally spaced apart rows of individual coulter wheel assemblies 50 are shown. A tongue constraint 110 is pivotally attached to the coupling mechanism 31 at constraint hinge 33. The tongue constraint 110 is variable in length and may be adjusted to level the frame with reference to ground. A set of spike harrows 112 and a set of rolling harrows 113 are mounted to a leveling attachment flange 111 that is itself mounted to rear mounting flange 34. The rolling harrows 113 are able to deflect upwardly in response to impact with obstacles by pivoting about their attachment to the leveling attachment flange 111. The upward deflection of the rolling harrows 113 is resisted by harrow spring 114, which is extended upon upward deflection. A rear coupling mechanism 120 is also provided for attachment of a leveling implement (not shown) to the rear of the cultivator frame.

Figure 13:
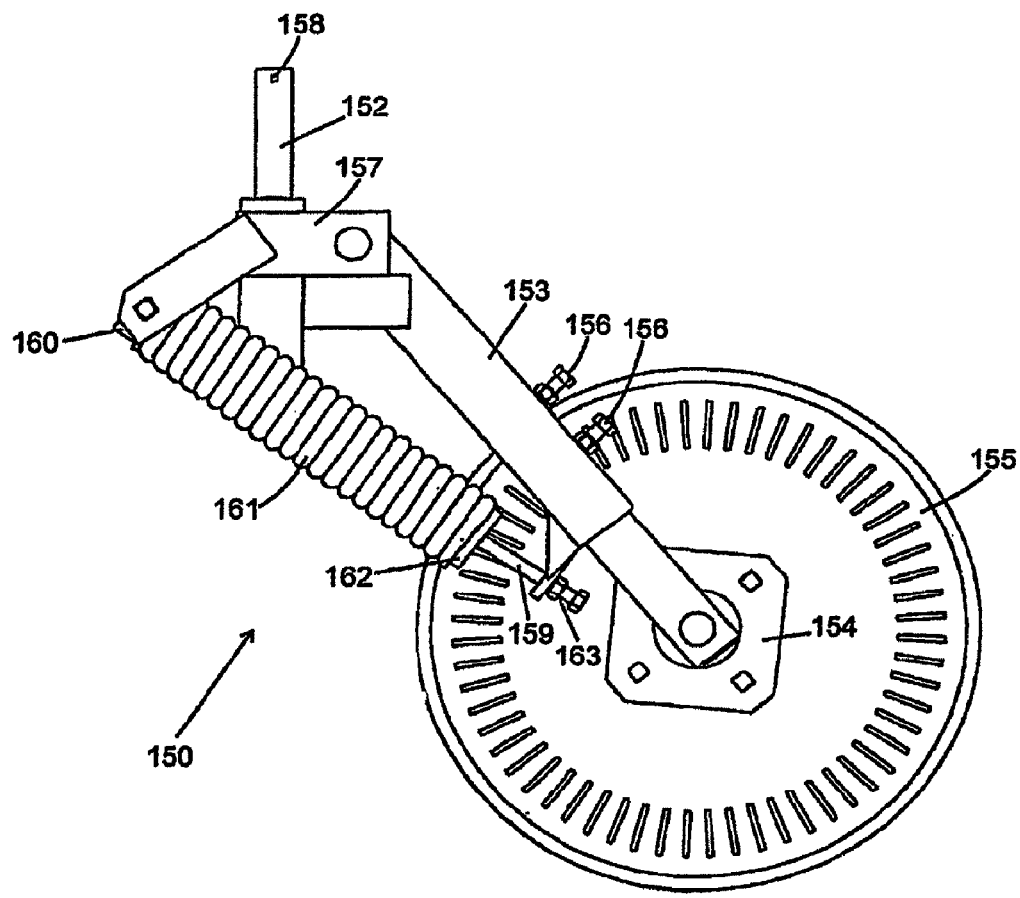

Referring to FIG. 13, a coulter wheel assembly 150 is shown that may be used as an alternative to the coulter wheel assembly 50 in a conservation tillage implement of the present invention. The coulter wheel assembly 150 comprises a lower shank portion 153 having a rotatable hub 154 rotatably attached thereto. A coulter wheel 155 having a plurality of radial ridges alternately extending from each side of the coulter wheel is mounted to the rotatable hub 154. The lower shank portion 153 is telescoping in length and is adjustable by means of shank bolts 156. The lower shank portion 153 is pivotally attached to the upper shank portion 152 by means of pivot plate 157. The upper shank portion 152 is circular in cross-section and may be inserted within hollow strut 61 of mounting means 60 (not shown in FIG. 13). A hole 158 is provided for receiving pin 63 when mounted using mounting means 60 in the manner previously described with reference to FIGS. 2-5. A deflection shaft 159 is adjustably mounted to the lower shank portion 153 and is slidaby received within a trunnioned deflection collar 160 offset from the upper shank portion 152. A deflection spring 161 is secured on the deflection shaft 159 at one end by the trunnioned deflection collar 160 and at the other end by a washer 162 fixedly mounted to the deflection shaft. The length of the deflection shaft 159 between the trunnioned deflection collar 160 and the point of attachment to the lower shank portion 153 may be adjusted via deflection set nut 163 to affect a desired angle between the upper shank portion 152 and the lower shank portion. Upon impact with an obstacle, the deflection shaft 159 slides within the trunnioned deflection collar 160 and the deflection spring 161 is deformed, thereby urging the lower shank portion 153 to return to the desired angle.

Other advantages which are inherent to the structure will be evident to one skilled in the art.

It will be understood that certain features and sub-combinations are of utility and may be employed without reference to other features and sub-combinations. This is contemplated by and is within the scope of the claims.

Since many possible embodiments may be made of the invention without departing from the scope thereof, it is to be understood that all matter herein set forth or shown in the accompanying drawings is to be interpreted as illustrative and not in a limiting sense.

A person skilled in the art will recognize that variants or mechanical equivalents may be substituted for certain of the previously described features without having an effect on the way in which the invention works.

What is claimed is:

1. A minimum tillage apparatus, comprising:
    a frame having at least four transverse frame members disposed substantially perpendicular to a direction of travel of said apparatus;
    at least one axle comprising two wheels, at least a first one of said four transverse frame members being disposed forward of said axle in said direction of travel, and at least a second one of said four transverse frame members being disposed rearward of said axle in said direction of travel;
    a first plurality of coulter wheel assemblies coupled to said first one of said four transverse members;
    a second plurality of coulter wheel assemblies coupled to said second one of said four transverse members, each one of said second plurality of coulter wheel assemblies being staggered in said direction of travel with respect to said first plurality of coulter wheel assemblies;
    a third plurality of coulter wheel assemblies coupled to a third one of said four transverse members, each one of said third plurality of coulter wheel assemblies being staggered in said direction of travel with respect to at least one of (i) said first plurality of coulter wheel assemblies and (ii) said second plurality of coulter wheel assemblies;
    a fourth plurality of coulter wheel assemblies coupled to a fourth one of said four transverse members, said fourth one of said transverse frame members disposed on an opposite side of said axle relative to said third one of said transverse frame members, said fourth plurality of coulter wheel assemblies being staggered in said direction of travel with respect to said third plurality of coulter wheel assemblies and with respect to at least one of said first and said second pluralities of coulter wheel assemblies:
    a mounting structure corresponding to each coulter wheel assembly and configured to couple the corresponding coulter wheel assembly to the frame, each mounting structure being configured to be movably fixable to plural different locations on the corresponding transverse member, each mounting structure configured to allow the coulter wheel assembly to be aligned with said direction of travel;
    each coulter wheel assembly comprising (i) a downwardly and rearwardly extending shank, (ii) a rotatable hub attached to a lower part of the shank, (iii) a resilient element configured to resist at least upward deflection of the rotatable hub, (iv) the coulter wheel assembly configured to permit upward and lateral deflection of the rotatable hub in response to impact with obstacles and to resiliently resist said deflection; and
    a plurality of coulter wheels, each coupled to a corresponding one of the rotatable hubs, each coulter wheel assembly supporting a single coulter wheel.

2. The minimum tillage implement according to claim 1, wherein the implement further comprises a plurality of tines mounted at a rear of said frame and configured to be staggered in said direction of travel with respect to at least one of the pluralities of mounting structures.

3. The minimum tillage implement according to claim 2, wherein the implement further comprises a plurality of rolling harrows coupled to said frame behind said plurality of tines in said direction of travel.

4. The minimum tillage implement according to claim 3, further comprising additional adjustment structure configured to adjust a height of said rolling harrow.

5. The minimum tillage implement according to claim 1, wherein the axle comprises a pair of walking axles, each walking axle comprising a pair of wheels that are staggered in the direction of travel.

6. The minimum tillage implement according to claim 1, further comprising adjustment structure configured to cause each coulter wheel to penetrate from one inch to four inches into the soil.

7. The minimum tillage implement according to claim 5, wherein said adjustment structure is configured to adjust both (i) a height of said frame and (ii) a tilt of said frame with respect to a horizontal axis passing through the axle.

8. The minimum tillage implement according to claim 1, wherein said frame comprises a central portion and two wing portions, and further comprising hydraulic lifting structure configured to lift said two wing portions relative to said central portion.

9. The minimum tillage implement according to claim 1, wherein each resilient element comprises a coil spring with a horizontal spring axis.

10. The minimum tillage implement according to claim 1, wherein each resilient element resists upward and lateral deflection of the corresponding rotatable hub.

11. The minimum tillage implement according to claim 1, wherein each shank pivots about a corresponding horizontal axis perpendicular to the direction of travel.

12. A minimum tillage implement comprising:
   a frame comprising: (i) a plurality of longitudinal frame members, (ii) at least four transverse frame members, (iii) a central portion with two sides, (iv) a wing portion hingedly attached to each side of said central portion, each wing portion having a corresponding hydraulic cylinder mounted to the central portion and said each wing portion, the hydraulic cylinder operable to pivot the two wing portions from a horizontal ground-working orientation to a vertical-transport orientation upon actuation of the hydraulic cylinder, and (v) the central portion further comprising a tongue adapted for connection to a drawbar of a tractor, the tongue attached to the central portion at a tongue hinge and supported by means of a tongue constraint that is configured to be extensible in order to affect a desired angular relationship between the tongue and the frame to adjust the frame at a desired working depth of the implement;
   a set of wheels having at least one wheel disposed on each side of the central portion beneath the frame, at least two of the four transverse frame members being disposed forward of the set of wheels in a longitudinal direction of travel, and at least two of the four transverse frame members being disposed rearward of the set of wheels in the direction of travel;
   at least four rows of laterally-adjustable, removably-mounted, individual coulter wheel assemblies, a coulter wheel assembly in a given row being laterally spaced apart from the remaining coulter wheel assemblies in that row and laterally staggered with respect to the coulter wheels assemblies in a longitudinally adjacent row, an arrangement of the coulter wheel assemblies being configured to reduce plugging between the coulter wheel assemblies;
   each coulter wheel assembly comprising a resilient element and a shank angled downwardly and rearwardly of the implement and comprising a rotatable hub to which is mounted a single substantially disc-shaped coulter wheel adapted for ground penetration, each coulter wheel assembly being configured to permit upward and lateral deflection of the rotatable hub in response to impact with obstacles and to resiliently resist said deflection; and,
   each coulter wheel assembly received within a corresponding individual mounting structure comprising clamping structure configured to removably secure the mounting structure to the transverse frame member so that the mounting structure is removable and laterally adjustable on the transverse frame members, each mounting structure supporting a single coulter wheel assembly, each mounting structure configured to allow the coulter wheel assembly to be aligned with the direction of travel of the implement.

13. The minimum tillage implement according to claim 12, further comprising a second set of wheels, each set of wheels comprising a first wheel and a second wheel longitudinally spaced apart and laterally staggered relative to one another and configured to reduce plugging between the wheels.

14. The minimum tillage implement according to claim 13, wherein each wheel is rotatably connected to a longitudinal axle mounting member that is pivotally attached to a lever arm at a pivot point that is located between the first and second wheels in order to permit the wheels to pivot about the pivot point in response to impact with obstacles, the lever arm pivotally attached to the frame, a hydraulic wheel cylinder pivotally connected to the frame and configured to be extensible to alter an angular relationship between the lever arm and the frame in order to adjust a height of the frame at the desired working depth of the implement.

15. The minimum tillage implement according to claim 12, wherein the implement further comprises a set of spike harrows and a set of rolling harrows, both pivotally attached at a rear of the frame.

16. The minimum tillage implement according to claim 12, wherein each rotatable hub is configured to deflect upwardly about a horizontal axis perpendicular to the direction of travel in response to impact of the coulter wheel with an obstacle.

17. The minimum tillage implement according to claim 16, wherein each shank pivots about the horizontal axis perpendicular to the direction of travel.

18. The minimum tillage implement according to claim 12, further comprising adjustment structure configured to be adjustable cause each coulter wheel to penetrate from one to four inches into the soil.

19. The minimum tillage implement according to claim 18, wherein said adjustment structure is configured to adjust both (i) a height of said frame and (ii) a tilt of said frame with respect to a horizontal axis passing through the set of wheels.

20. The minimum tillage implement according to claim 12, wherein the resilient element resists upward and lateral deflection of the rotatable hub.

* * * * *